(12) United States Patent
Kakuno et al.

(10) Patent No.: US 12,386,567 B2
(45) Date of Patent: Aug. 12, 2025

(54) RASTER IMAGE CONVERSION DEVICE AND PROGRAM, AND PRINTING SYSTEM

(71) Applicant: MUTOH INDUSTRIES LTD., Tokyo (JP)

(72) Inventors: Norishige Kakuno, Suwa-gun (JP); Kazuhiro Tokunari, Suwa-gun (JP)

(73) Assignee: MUTOH INDUSTRIES LTD., Tokyo (JP)

( * ) Notice: Subject to any disclaimer, the term of this patent is extended or adjusted under 35 U.S.C. 154(b) by 415 days.

(21) Appl. No.: 18/021,843

(22) PCT Filed: Aug. 25, 2021

(86) PCT No.: PCT/JP2021/031096
§ 371 (c)(1),
(2) Date: Feb. 17, 2023

(87) PCT Pub. No.: WO2022/045170
PCT Pub. Date: Mar. 3, 2022

(65) Prior Publication Data
US 2023/0234385 A1    Jul. 27, 2023

(30) Foreign Application Priority Data

Aug. 31, 2020  (JP) ................................ 2020-145547
Feb. 25, 2021  (JP) ................................ 2021-028865

(51) Int. Cl.
*G06K 15/00* (2006.01)
*G06F 3/12* (2006.01)
*G06K 15/02* (2006.01)

(52) U.S. Cl.
CPC .......... *G06F 3/1211* (2013.01); *G06F 3/1288* (2013.01); *G06K 15/1836* (2013.01);
(Continued)

(58) Field of Classification Search
CPC ...... G06F 3/1211; G06F 3/1288; G06F 3/127; G06F 3/1204; G06F 3/1262;
(Continued)

(56) References Cited

U.S. PATENT DOCUMENTS

2009/0273799 A1   11/2009  Hanawa
2010/0002247 A1*  1/2010   Tsuchiya .............. H04N 1/2112
                                                        358/1.9
(Continued)

FOREIGN PATENT DOCUMENTS

EP    1 031 916 A2    8/2000
EP    1 031 916 A3    4/2002
(Continued)

OTHER PUBLICATIONS

IP.com Search history (Year: 2025).*
Nov. 30, 2021 Search Report issued in International Patent Application No. PCT/JP2021/031096.
Jan. 2, 2024 Extended European Search Report Issued in European Patent Application No. 21861594.6.

*Primary Examiner* — Moustapha Diaby
(74) *Attorney, Agent, or Firm* — Oliff PLC

(57) ABSTRACT

A raster image conversion device is inputted with printing data and converts this printing data into raster image data to be outputted to a printing device. A storage unit stores printing environment data stipulating conditions for converting the printing data into the raster image data. An operating unit sets or edits the printing environment data. A conversion processing unit converts the printing data into the raster image data, based on the printing environment data. The printing environment data includes printing template information having a plurality of printing slots. The operating unit comprises an operating mode enabling the printing template information to be generated or edited. The conversion processing unit is inputted with or creates printing data made up of a plurality of pages, and, based on the printing template information, allocates a printing position and print- (Continued)

ing range of each page of the printing data to the printing slots.

12 Claims, 15 Drawing Sheets

(52) U.S. Cl.
CPC ..... *G06K 15/1868* (2013.01); *G06K 15/1886* (2013.01); *G06K 15/1894* (2013.01); *G06F 3/127* (2013.01)

(58) Field of Classification Search
CPC ........... G06K 15/1836; G06K 15/1868; G06K 15/1886; G06K 15/1894; B29C 64/386; B29C 64/112; B41J 2/2117
USPC ......................................................... 358/1.18
See application file for complete search history.

(56) References Cited

U.S. PATENT DOCUMENTS

| 2014/0092409 | A1* | 4/2014 | Ito ....................... G06K 15/024 |
| | | | 358/1.11 |
| 2016/0328194 | A1 | 11/2016 | Staples et al. |
| 2017/0017440 | A1* | 1/2017 | Robinson .............. G06F 3/1285 |
| 2018/0267754 | A1 | 9/2018 | Miyamoto |

FOREIGN PATENT DOCUMENTS

| JP | 2004-234500 A | 8/2004 |
| JP | 2013-159035 A | 8/2013 |
| JP | 2016-212869 A | 12/2016 |
| JP | 2018-114702 A | 7/2018 |
| WO | 2005/027504 A1 | 3/2005 |
| WO | 2008/117827 A1 | 10/2008 |

* cited by examiner (a) Fence  (b) Corner  (c) Square (d)  (e)  (f)

Example where P=3, S=4

| Page | Skip | Print |
|------|------|-------|
| 1 | — | 1 |
| 2 | — | 2 |
| 3 | — | 1 |

| Page | Skip | Print |
|------|------|-------|
| 1    | —    | 1     |
| 2    | —    | 1     |

FIG. 14
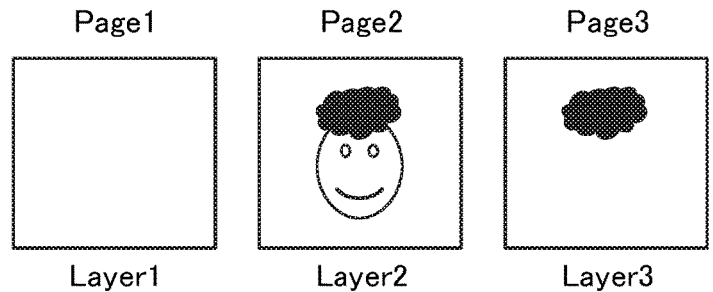
FIG. 15
Example where P=3, S=4
| Layer | Page | Color mode | Skip | Multiplex | Print |
|---|---|---|---|---|---|
| 1 | 1 | White | — | — | 4 |
| 2 | 2 | CMYK | — | — | 4 |
| 3 | 3 | Varnish | — | — | 4 |
FIG. 16
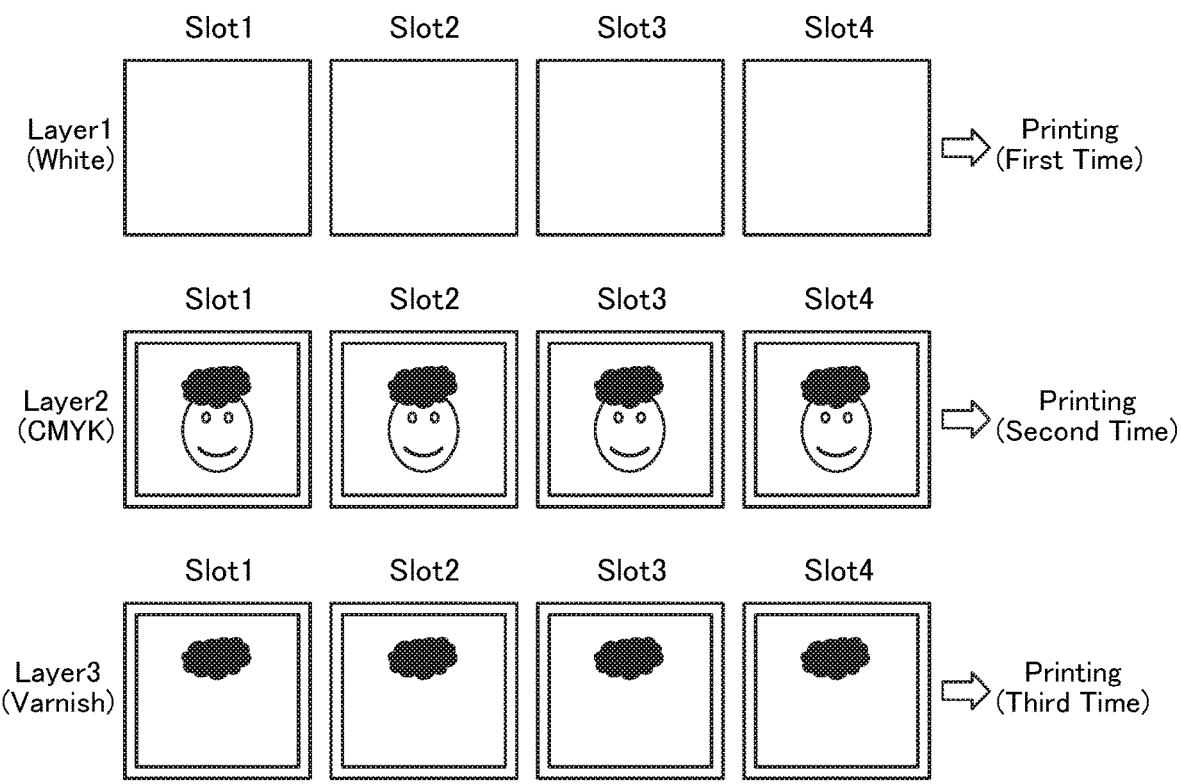

| Layer | Page | Color mode | Skip | Multiplex | Print |
|---|---|---|---|---|---|
| 1 | 1 | CMYK | — | — | 4 |
| 2 | 2 | Varnish | — | 1 | 4 |

FIG. 22
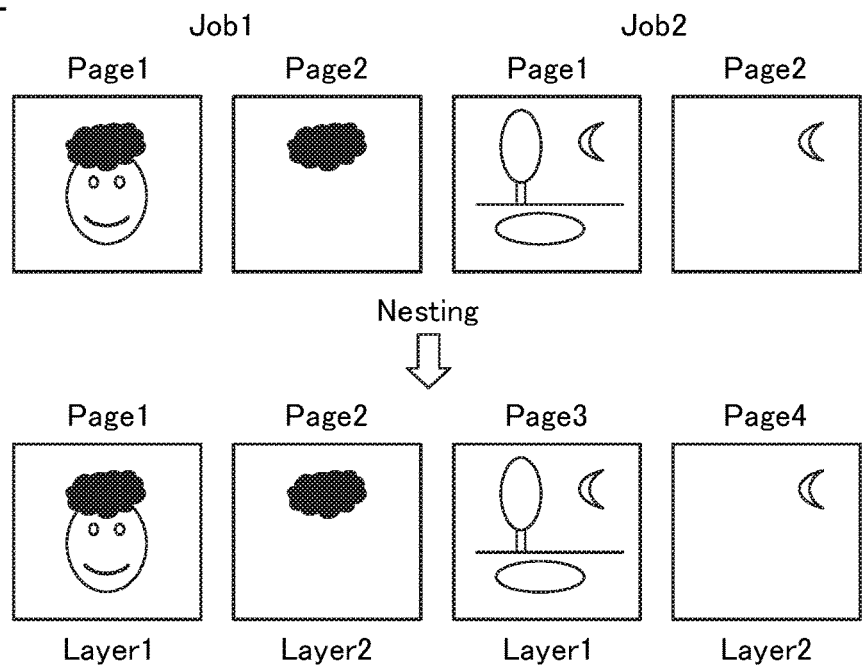
FIG. 23
| Layer | Page | Color mode | Skip | Multiplex | Print |
|---|---|---|---|---|---|
| 1 | 1 | CMYK | — | — | 3 |
| 2 | 2 | Varnish | — | — | 3 |
| 1 | 3 | CMYK | — | — | 1 |
| 2 | 4 | Varnish | — | — | 1 |
FIG. 24
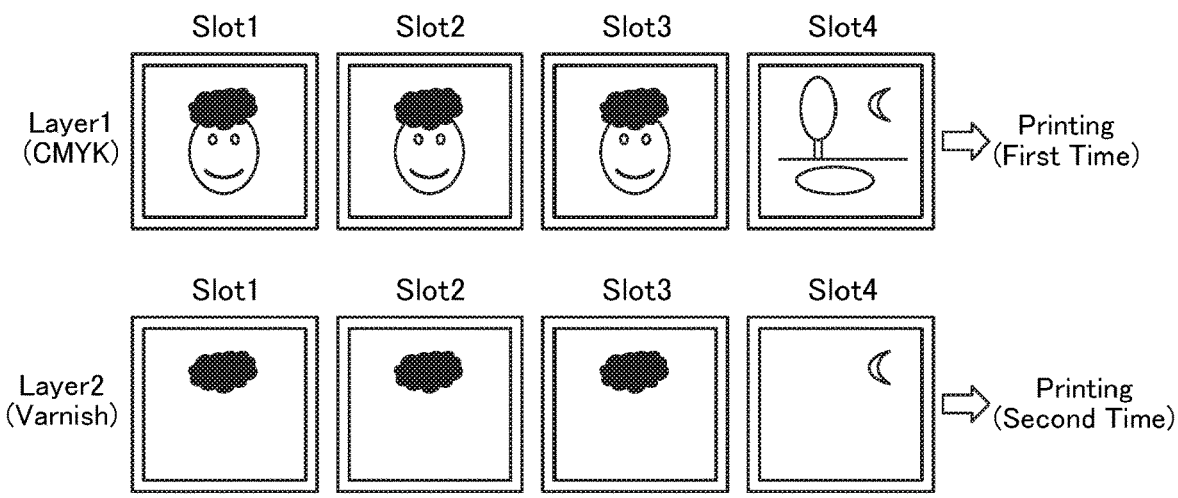

| Layer | Page | Color mode | Skip | Multiplex | Print |
|---|---|---|---|---|---|
| 1 | 1 | CMYK | — | — | 1 |
| 2 | 2 | Varnish | — | — | 1 |
| 1 | 3 | CMYK | — | — | 1 |
| 2 | 4 | Varnish | — | — | 1 |

| Layer | Page | Color mode | Skip | Multiplex | Print |
|---|---|---|---|---|---|
| 1 | 1 | CMYK | — | — | 1 |
| 2 | 2 | Varnish | — | — | 1 |
| 3 | 3 | CMYK | — | — | 1 |
| 4 | 4 | Varnish | — | — | 1 |

RASTER IMAGE CONVERSION DEVICE AND PROGRAM, AND PRINTING SYSTEM

TECHNICAL FIELD

The present invention relates to a raster image conversion device and program, and a printing system.

BACKGROUND ART

In the case of a plurality-of-items of printing data being printed all at once at a vertically- and horizontally-arranged plurality of printing places by a printing device such as an ink jet printer, there is a need for printing positions to be priorly allocated on a table (platen) of the printing device.

Specifically, in such cases as when a plurality-of-items of printing data are overlappingly printed, or when a plurality of layers of even a single-item of printing data are overlappingly printed, generally, either the items of printing data representing a printing source are inputted as respectively differing items of printing data, or there is inputted a single-item of printing data that has been priorly created by aligning a plurality-of-items of printing data (Patent Document 1).

PRIOR ART DOCUMENT

Patent Document

Patent Document 1: Japanese Laid-Open Patent Publication No. 2018-114702

SUMMARY OF THE INVENTION

Problem to be Solved by the Invention

However, in the former case, there becomes required an operation to designate at what positions the individual items of printing data are to be printed. Moreover, in the latter case, there must be priorly generated an item of printing data made up of a two-dimensionally arranged plurality of images.

The present invention, which has been made in view of the above-described circumstances, has an object of providing a raster image conversion device and program, and a printing system, that excel in operability and by which even a differing plurality-of-items of printing data can be simply allocated with printing places.

Means for Solving the Problem

A raster image conversion device according to an embodiment of the present invention, which is a raster image conversion device that is inputted with printing data, and converts this printing data into raster image data to be outputted to a printing device, has: a storage unit that stores printing environment data stipulating conditions for converting the printing data into the raster image data; an operating unit for setting or editing the printing environment data stored in the storage unit; and a conversion processing unit that converts the printing data into the raster image data, based on the printing environment data stored in the storage unit. The printing environment data includes printing template information having a plurality of printing slots. The operating unit comprises an operating mode enabling the printing template information to be generated or edited. The conversion processing unit is inputted with or creates printing data made up of a plurality of pages, and, based on the printing template information, executes a printing data allocation processing in which a printing position and printing range of each page of the printing data are allocated to the printing slots of the printing template information.

A printing system according to an embodiment of the present invention comprises: a raster image conversion device that is inputted with printing data and converts this printing data into raster image data; and a printing device that performs printing onto an object-to-be-printed, based on raster image data that has been converted by the raster image conversion device. The printing device is an ink jet printer capable of multi-layer printing using UV-curable ink. The raster image conversion device has: a storage unit that stores printing environment data stipulating conditions for converting the printing data into the raster image data; an operating unit for generating or editing the printing environment data stored in the storage unit; and a conversion processing unit that converts the printing data into the raster image data, based on the printing environment data stored in the storage unit. The printing environment data includes printing template information having a plurality of printing slots. The operating unit comprises an operating mode enabling the printing template information to be generated or edited. The conversion processing unit is inputted with or creates printing data made up of a plurality of pages, and, based on the printing template information, executes a printing data allocation processing in which a printing position and printing range of each page of the printing data are allocated to the printing slots of the printing template information. The printing device performs single-layer or multi-layer printing of the raster image data, onto the object-to-be-printed disposed at a position corresponding to the printing slot, by means of the UV-curable ink.

A raster image conversion program according to an embodiment of the present invention, which is a printing processing program by which printing data is inputted, and this printing data converted into raster image data to be outputted to a printing device, causes a computer to execute: a storage step in which printing environment data stipulating conditions for converting the printing data into the raster image data, is stored; an operating step for generating or editing the printing environment data stored in the storage step; and a conversion processing step in which the printing data is converted into the raster image data, based on the printing environment data stored in the storage step. The printing environment data includes printing template information having a plurality of printing slots. The operating step has a step in which the printing template information is generated or edited. The conversion processing step includes a printing data allocation processing step in which printing data made up of a plurality of pages is inputted or created, and, based on the printing template information, a printing position and printing range of each page of the printing data are allocated to the printing slots of the printing template information.

Effect of the Invention

The present invention makes it possible to provide a raster image conversion device and program, and a printing system that excel in operability.

BRIEF DESCRIPTION OF THE DRAWINGS

FIG. 14 is a schematic view showing one example of multi-page multi-layer printing data inputted to same device.

FIG. 15 is a diagram showing an example of layout information of same printing data.

FIG. 16 is a schematic view showing an example where the printing data has been allocated to each of the printing slots based on same layout information.

FIG. 22 is a schematic view showing an example where a multi-layer multi-job undergoes nesting to generate multi-page multi-layer printing data.

FIG. 23 is a diagram showing an example of layout information of same printing data.

FIG. 24 is a schematic view showing an example where the printing data has been allocated to each of the printing slots based on same layout information.

EMBODIMENTS FOR CARRYING OUT THE INVENTION

A raster image conversion device and program, and a printing system according to embodiments of the present invention will be described in detail below with reference to the accompanying drawings. However, the embodiments below do not limit the invention according to each of the claims, moreover, not all of the combinations of features described in the embodiments are necessarily essential to the means for solving the problem of the invention.

EMBODIMENT

[Device Configuration]

Figure 1:
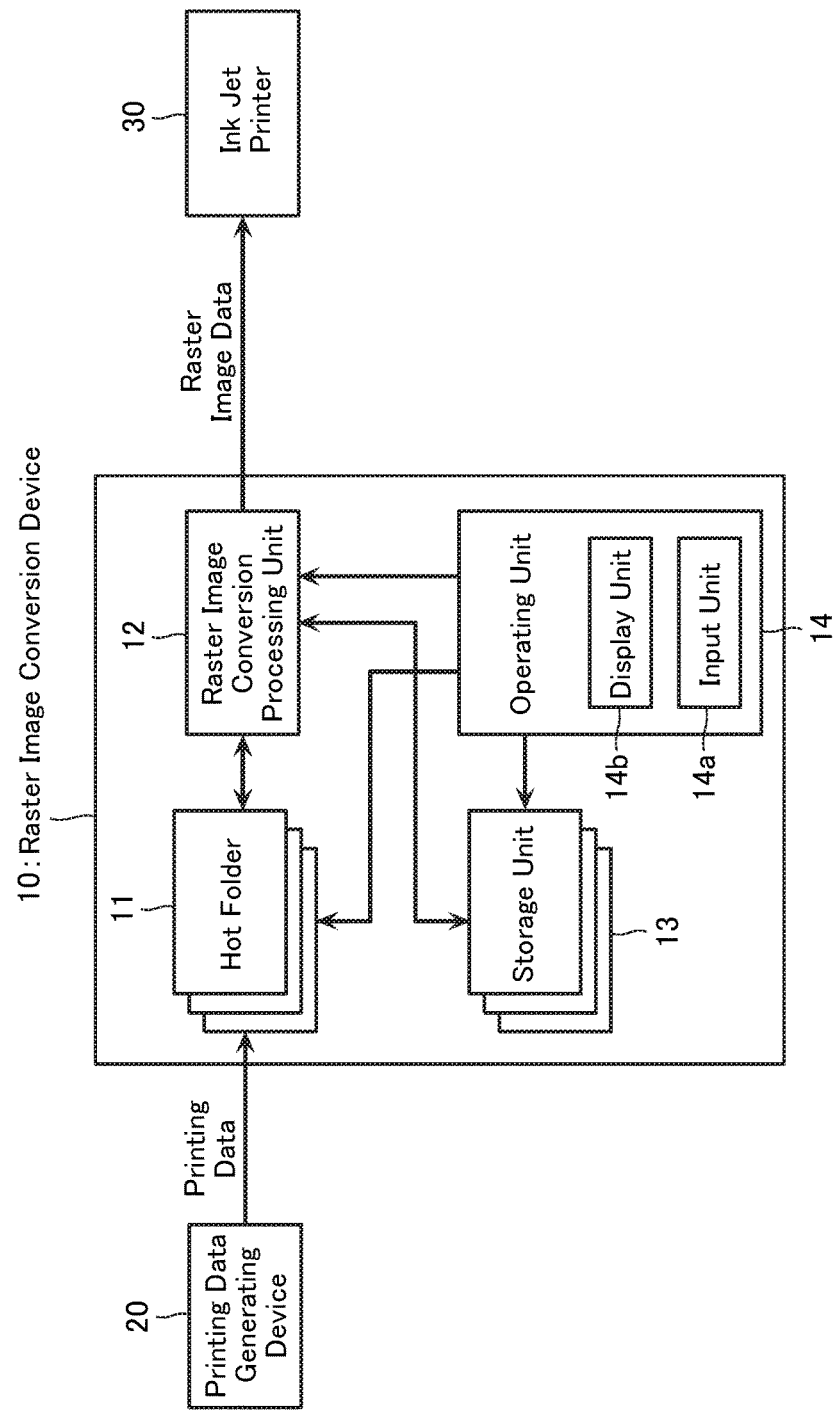
FIG. 1 is a functional block diagram schematically showing a printing system employing a raster image conversion device according to one embodiment.

FIG. 1 is a functional block diagram showing schematic configuration of a printing system according to one embodiment of the present invention. This printing system comprises a printing data generating device 20, a raster image conversion device 10, and an ink jet printer 30 that acts as a printing device.

The printing data generating device 20 generates a printing job made up of a vector-format page description language such as PDF (Portable Document Format) or PS (PostScript: registered trademark), or of image-compressed image data such as JPEG (Joint Photographic Experts Group) and TIFF (Tagged Image File Format), for example, and outputs the generated printing job to the inkjet printer 30 via the raster image conversion device 10. Note that "printing job" here includes "printing data", and refers to a descriptive printing command for printing the printing data. Moreover, "printing data" refers to data including characters, diagrams, images, and so on, that are to be printed according to the printing job. Hereafter, information outputted from the printing data generating device 20 will sometimes be written as "printing data" or "printing job". Moreover, printing data including printing environment data at a time of the printing data being converted into raster image data to be outputted, and a series of processing up to the raster image data being outputted to the ink jet printer 30 after execution of conversion processing based on the printing environment data, within the raster image conversion device 10, will sometimes also be respectively called "printing job" and "printing workflow" in a broad sense.

The raster image conversion device 10 converts the printing data made up of vector data with which it has been inputted, into raster image data to be outputted to the ink jet printer 30. The raster image conversion device 10 may be configured as an RIP (Raster Image Processor) device realized by causing an unillustrated CPU to execute an RIP program, for example. The ink jet printer 30 can be configured as a printing device capable of multi-layer printing using UV (Ultra-Violet)-curable ink, for example.

The raster image conversion device 10 functionally has one or a plurality of hot folders 11, a raster image conversion processing unit 12, a storage unit 13, and an operating unit 14.

The hot folder 11 is a folder storing printing data that has been outputted from the printing data generating device 20. This hot folder 11 is associated with printing environment data. Due to printing data being stored in the hot folder 11, the printing workflow is activated with reference to the printing environment data corresponding to that hot folder 11.

The raster image conversion processing unit 12 monitors whether printing data has been stored in the hot folder 11, and when printing data is stored in the hot folder 11, performs the likes of rasterize processing, color-matching processing, and half-tone processing on the printing data, according to the printing environment data corresponding to that hot folder 11, and outputs the processed printing data as raster image data to the ink jet printer 30.

Figure 2:
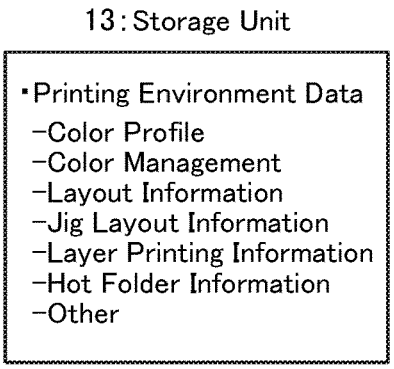
FIG. 2 is a schematic view showing content stored in a storage unit in same device.

A shown in FIG. 2, the storage unit 13 stores the printing environment data stipulating the printing workflow by which conversion processing by the raster image conversion processing unit 12 is to be executed. The printing environment data has stored therein the likes of: information of color profile and color management required for color-matching; layout information of the printing data; jig layout information for generating a jig in the case of a jig being required in printing; layer printing information in the case of multi-layer printing; and hot folder information corresponding to that printing workflow.

The operating unit 14 has: an input unit 14a such as a keyboard and mouse; and a display unit 14b such as a display device. The operating unit 14 has a function for performing a storage operation of printing data to the hot folder 11, various kinds of operations on the raster image conversion processing unit 12, and generation and editing of printing environment data stored in the storage unit 13, using the input unit 14a and display unit 14b.

[Creation of Jig]

Figure 3:
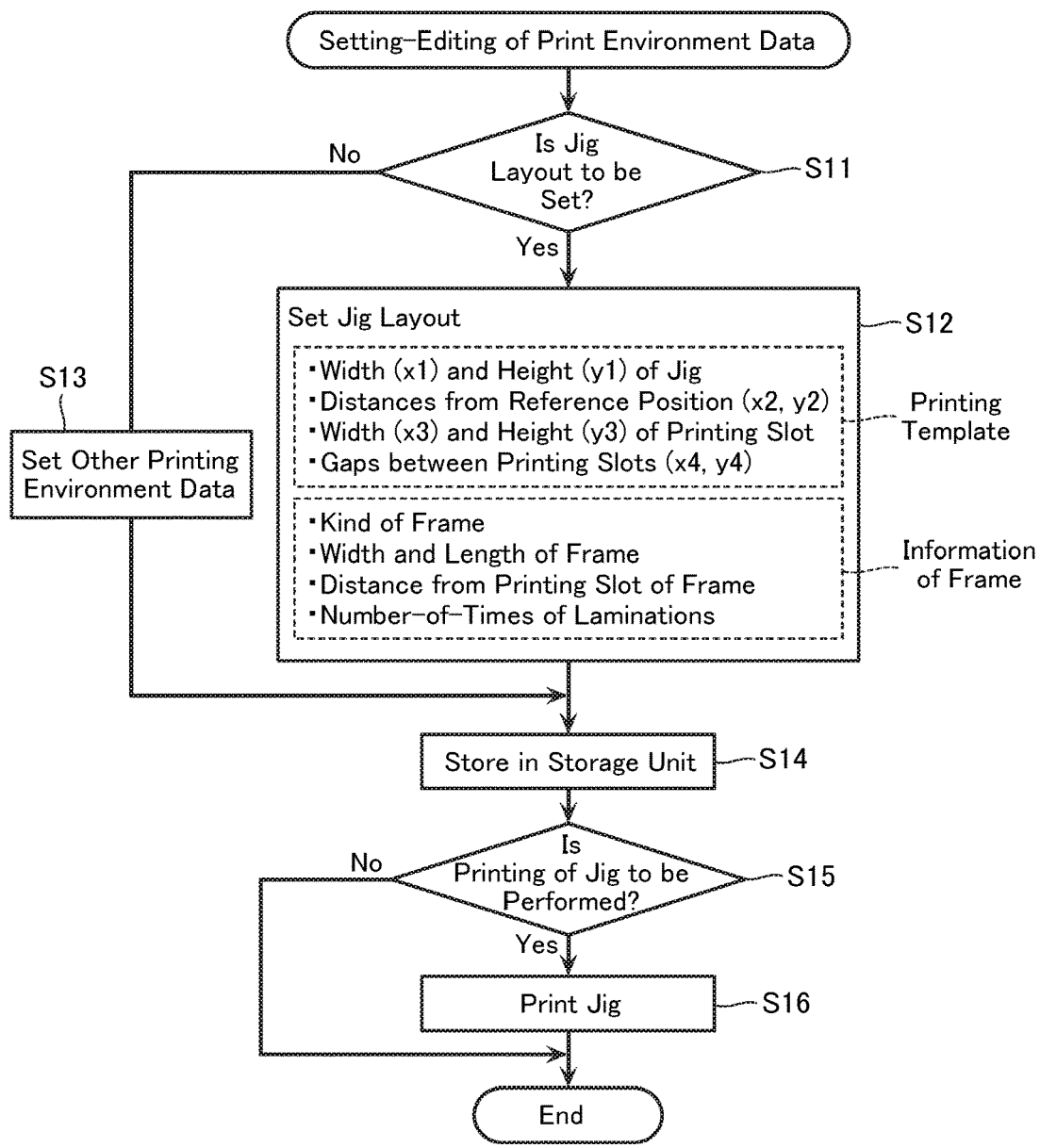
FIG. 3 is a flowchart showing order of creation of a jig in same device.

Next, jig creation processing prior to printing processing will be described. FIG. 3 is a flowchart showing processing for setting-and-editing of the printing environment data.

First, it is judged whether there is an instruction for setting of jig layout, or not (step S11). If there is an instruction for setting of jig layout, then processing for setting of the jig layout is executed (step S12). If there is not an instruction for setting of jig layout, then processing for setting of other printing environment data is executed (step S13). In the case of processing for setting of the jig layout having been selected, there will be executed setting of a printing template for when the printing data included in the jig layout information is allocated, and setting of information of a frame configuring the jig.

Figure 4:
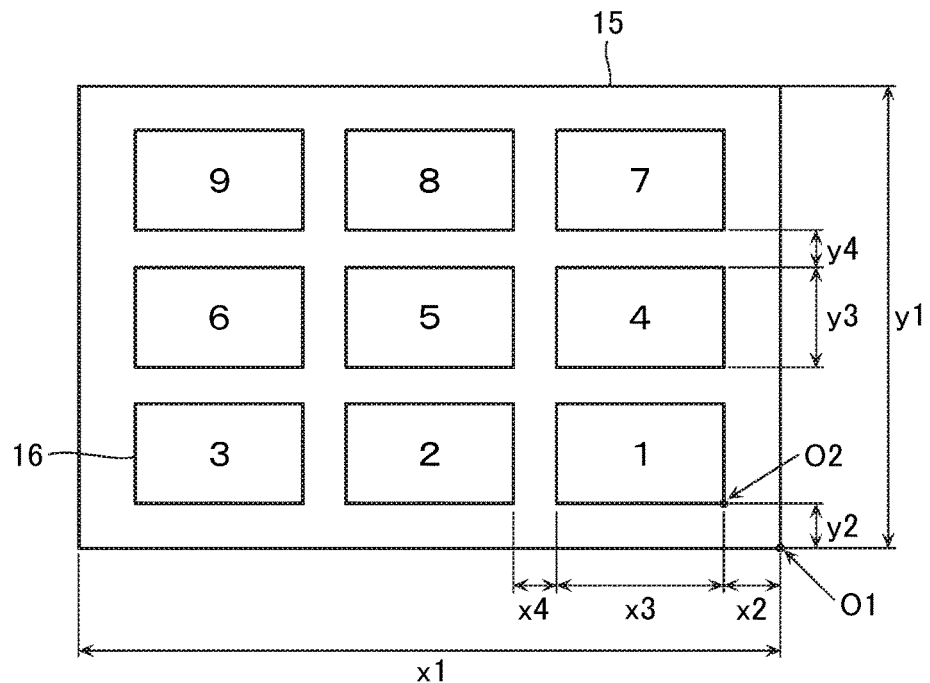
FIG. 4 is a schematic view for explaining a setting operation of a jig layout in same device.

FIG. 4 is a schematic view showing each of parameters of the printing template. The display unit 14b displays an image of the jig layout and input boxes of each of the parameters. The parameters of the printing template in the jig layout include width (x1), height (y1), distances between reference position O1 and printing start position O2 (x2, y2) of a jig 15, width (x3) and height (y3) of a printing slot 16 arranged in the jig 15, and gaps between the printing slots 16 (x4, y4). As illustrated, each of the printing slots 16 may be configured corresponded with a slot number.

Figure 5:
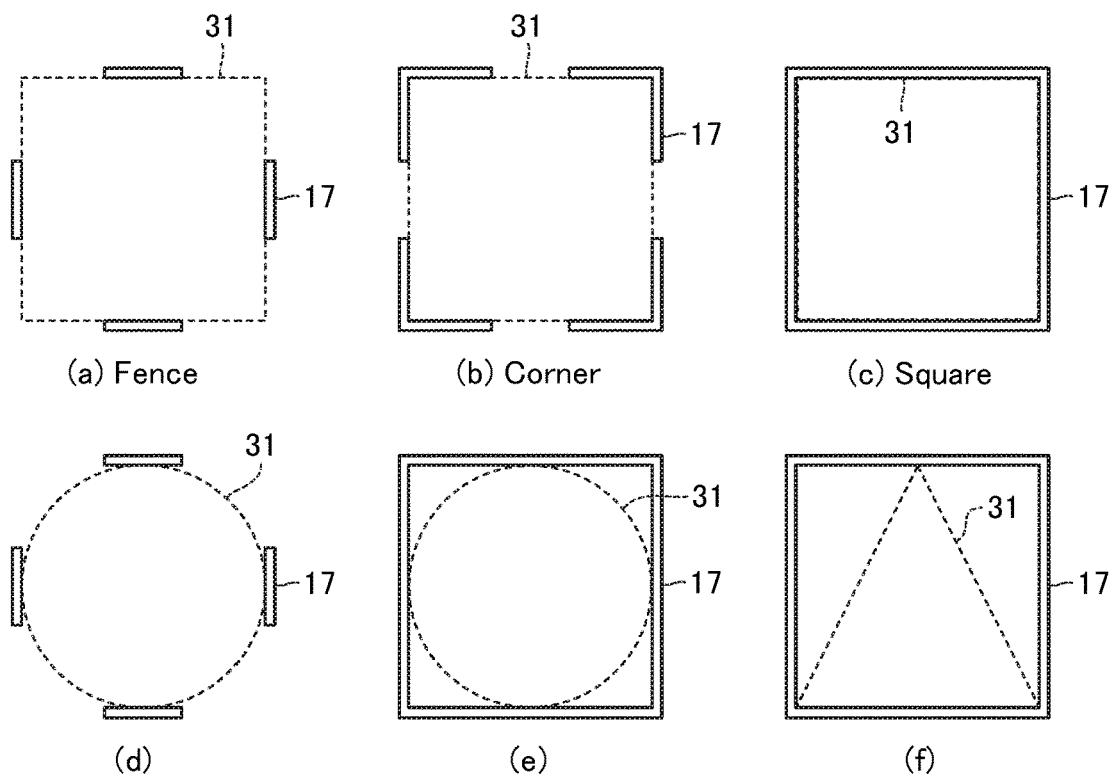
FIG. 5 is a schematic view showing kinds of frames of the jig layout in same device.

On the other hand, information of the frame of the jig layout includes information of kind of frame required in the jig creation, width and length of the frame, distance from the printing slot 16 of the frame, and number-of-times of printing laminations by UV-curable ink. FIG. 5 is a diagram showing the kinds of the frame. As illustrated, the kinds of frame include "fence" in (a) of same diagram, "corner" in (b) of same diagram, and "square" in (c) of same diagram. The "fence" is a linear frame in which left-and-right frames 17 and upper-and-lower frames 17 are respectively disposed in center portions in an up-down direction of left-and-right sides of the printing slot 16 and center portions in a left-right direction of upper-and-lower sides of the printing slot 16, with respect to an object-to-be-printed 31. The "corner" is an L-shaped frame defining a position of four corners of the object-to-be-printed 31. The "square" is a square ring-like frame continuously enclosing a periphery of a square object-to-be-printed 31. If the object-to-be-printed 31 is of square thin plate-like form, then the "fence" and "corner" in (a) and (b) of same diagram will make removal from the jig of the object-to-be-printed 31 easier due to these "fence" and "corner" having portions where the frame 17 does not exist. As shown in (d) and (e) of same diagram, the "fence" and "square" enable even a circular object-to-be-printed 31 to be positioned, and, as shown in (f) of same diagram, the "square" enables even a triangular object-to-be-printed 31 to be positioned. Hence, by appropriately selecting the kind of frame, it becomes possible for it to be commonly used even for differing outer shapes of the object-to-be-printed 31.

Upon setting of the jig layout being completed, this jig layout information is stored in the storage unit 13 (step S14). Moreover, in the case of other printing environment data having been set, too, this other printing environment data is stored in the storage unit 13 (step S14). Next, it is judged by instruction information from the operating unit 14 whether printing of the jig is to be executed (step S15), and, if creation of the jig is instructed, then printing of the jig is executed (step S16). In processing for printing of the jig, the raster image conversion processing unit 12 generates raster image data of the frame of the jig, and outputs this raster image data to the ink jet printer 30 as many times as the number-of-times of printing laminations, based on the jig layout information. As a result, the jig is printed by the ink jet printer 30.

Figure 6:
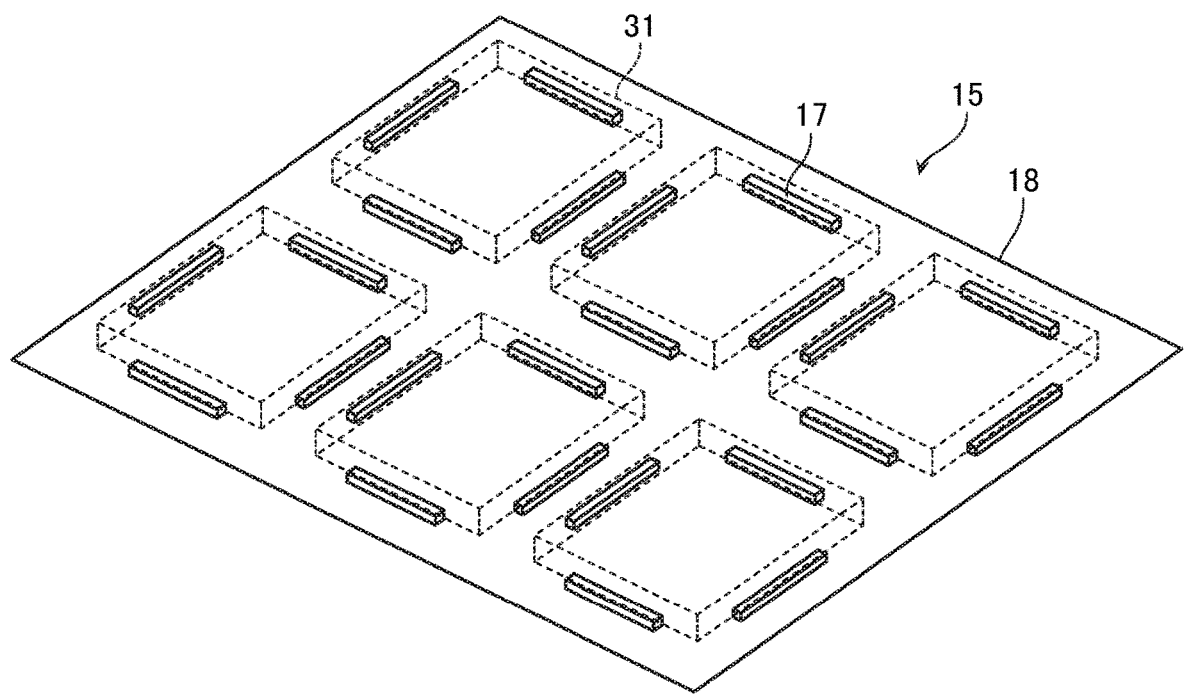
FIG. 6 is a perspective view showing an example of the jig created by same device.

FIG. 6 shows an example of a jig having been created in the case where kind of frame is "fence". The jig 15 is created by print formation of the frame 17 by multi-layer printing of UV-curable ink, for example, on a sheet-like printing medium 18 such as rigid media, for example, based on the jig layout information. Since the frame 17 is formed by thickly-layered printing, the object-to-be-printed 31 can be stably positioned.

Note that the previously mentioned "fence" and "corner" are effective in shortening of required time for printing of the frame 17 of the jig 15 and in reduction of ink usage amount too. Optimum values of each of side lengths of "fence" and "corner" depend on shape (size and thickness) of the object-to-be-printed 31, hence the input unit 14a has a function for editing each of the side lengths.

Note that a once created jig can be repeatedly used in other printing jobs too. In this case, a search should be made of a plurality-of-items of the printing environment data being stored, on the raster image conversion device 10, and the jig layout to be used selected.

In this way, the jig layout information is created with reference to the printing template stipulating position and range of printing, so by printing data being allocated to the printing template, it will result in position of the object-to-be-printed on the jig and printing position coinciding, whatever that printing data to be printed is.

[Processing for Conversion to Raster Image Data of Printing Data]

Figure 7:
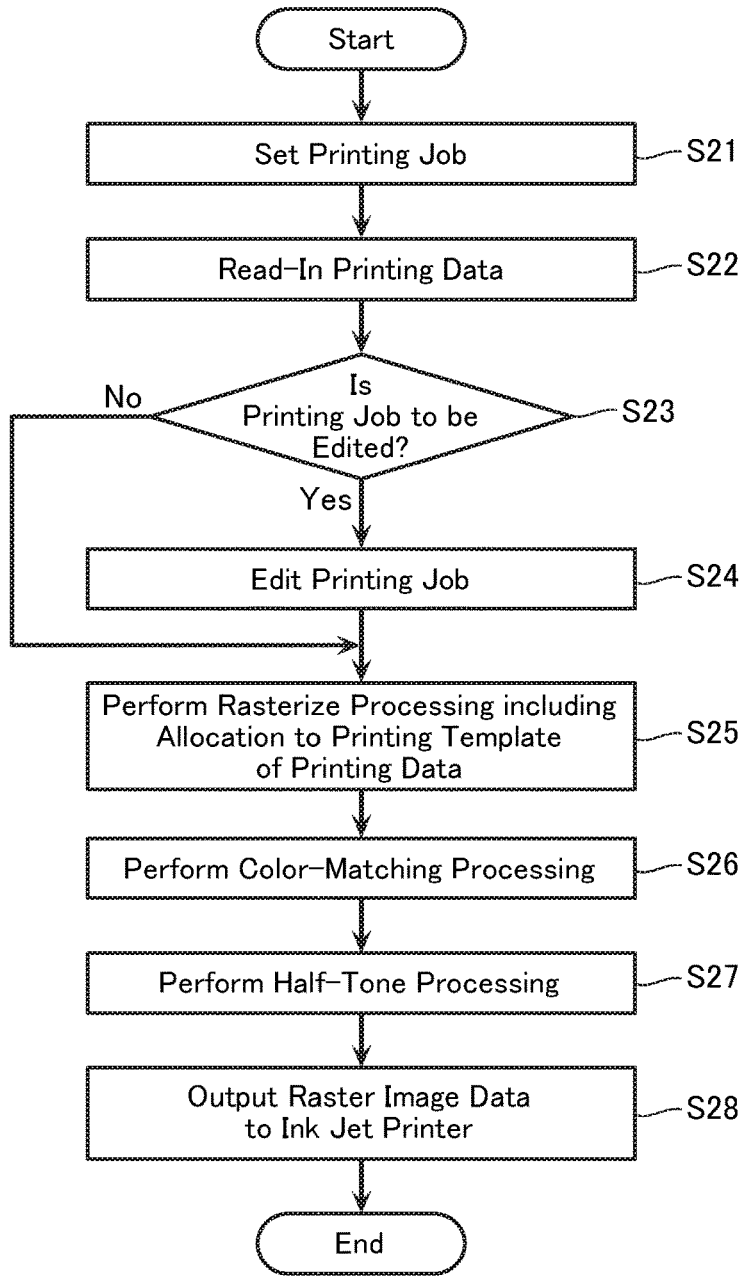
FIG. 7 is a flowchart showing printing processing of same device.

FIG. 7 is a flowchart showing raster image conversion processing (printing workflow) in the raster image conversion processing unit 12.

First, setting of the printing job such as setting of initial values of the printing environment data shown in FIG. 3 is priorly performed (step S21). Next, the printing data is read in from the hot folder 11 (step S22). Now, in the case where editing of the printing job has been judged necessary for the newly read-in printing data (step S23), the printing job is edited (step S24).

Examples of editing of the printing job include the likes of nesting processing of a plurality of printing jobs, and editing processing of the printing environment data, that will be mentioned later. Next, rasterize processing including allocation to the printing template of the printing data, is executed (step S25). Due to this processing, raster image data (CMYK data) is allocated to each printing slot of the printing template.

Next, the raster image conversion processing unit 12 executes color-matching processing on the raster image data that has been allocated to the printing template (step S26). In the color-matching processing, color conversion processing is implemented on the raster image data with reference to the color profile information and color management information including an input profile and ink jet printer 30 output profile, included in the printing environment data, that have been stored in the storage unit 13. Specifically, first, as color-management processing, the raster image conversion processing unit 12 develops the raster image data (for example, 8-bit_CMYK data) into an L*a*b* color system color space, for example, and color-converts it into device-independent-color L*a*b* values, with reference to the input profile (ICC profile) such as Japan Color (registered trademark) stored in the storage unit 13.

Then, the raster image conversion processing unit 12 re-color-converts the L*a*b* values into device-dependent-color CMYK values (8-bit_CMYK data), with reference to the ink jet printer 30 output profile (ICC profile).

In addition, as color-calibration processing, the raster image conversion processing unit 12 may execute generation of light ink colors (Lc, Lm, Lk), generation of distinctive ink colors (W: White/V: Varnish) for base color printing and thickly-layered printing, adjustment of ink amount (tone-curve adjustment), and so on. Thus, the raster image conversion processing unit 12 executes the whole of so-called color-matching processing including color-management processing and color-calibration processing.

Next, the raster image conversion processing unit 12 executes half-tone processing using an error diffusion method, or the like, based on the CMYK values (8-bit_CMYKLcLmLkWV data) (step S27). As a result, for example, the 8-bit_CMYK data is converted into, for example, device-dependent-color multi-size-dot CMYK values (2-bit_CMYKLcLmLkWV data).

Then, the raster image data made up of the converted multi-size-dot CMYK values (2-bit_CMYKLcLmLkWV data) is outputted to the ink jet printer 30 (step S28).

[Allocation Processing of Printing Data]

Next, details of processing for allocation to the printing template of the printing data described in step S25 of FIG. 7, will be described.

Note that in the case of the above-mentioned jig 15 being used, this processing is activated in a state where the jig 15 has been arranged on an unillustrated table (platen) of the ink jet printer 30 in a state of a reference position of the table and the reference position O1 of the jig 15 having been made coincident, and the object-to-be-printed 31 has been set in each of the frames 17. However, this processing does not necessarily presuppose use of the above-mentioned jig 15, and there may be used a jig that has shapes of the printing slots ordinarily printed on a printing medium. Moreover, this allocation processing is applicable too to such a case as when an outer frame image of the printing slots 16 is printed directly on the unillustrated table (platen) of the ink jet printer 30, and the object-to-be-printed 31 is set matching each of the printing slots 16. In short, the object-to-be-printed 31 should be disposed in the correct printing position.

(1) Multi-Page Single-Layer Printing

In the case of a differing plurality-of-items of the printing data being printed respectively allocated to separate printing slots of the printing template, there has usually been required an allocation operation in order that, in the printing data generating device 20, the plurality-of-items of the printing data are created as separate PDF files, for example, and the separate PDF files are respectively allocated to separate printing slots. In contrast, in the present embodiment, these separate PDF files are inputted to the raster image conversion device 10 as a single multi-page PDF file item of printing data, and, as a result, the raster image conversion processing unit 12 has a function for automatically allocating each page to each of the printing slots, and a printing workflow for that function.

Figure 8:
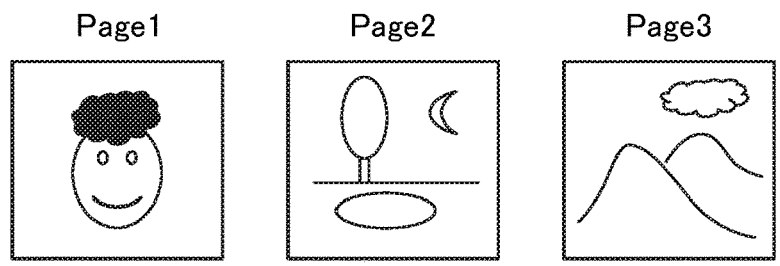
FIG. 8 is a schematic view showing one example of multi-page single-layer printing data inputted to same device.

FIG. 8 shows an example of multi-page single-layer printing data to be inputted. This printing data has three pages of differing image data. Converting the plurality-of-items of PDF data into a multi-page PDF data item may be performed using the printing data generating device 20, or may be performed by editing work of the printing job (step S24) by the raster image conversion device 10. However, if the printing data generating device 20 is used, then in order to automate from the printing job being fed into the hot folder 11 up to printing output of the inkjet printer 30, that series of processing must be priorly recorded in the printing environment data as the printing workflow. When the printing workflow is priorly created by the printing data generating device 20, it is possible for layout information of each page of the multi-page PDF to be stored as the printing environment data, and automated as the printing workflow.

Figures 9, 10:
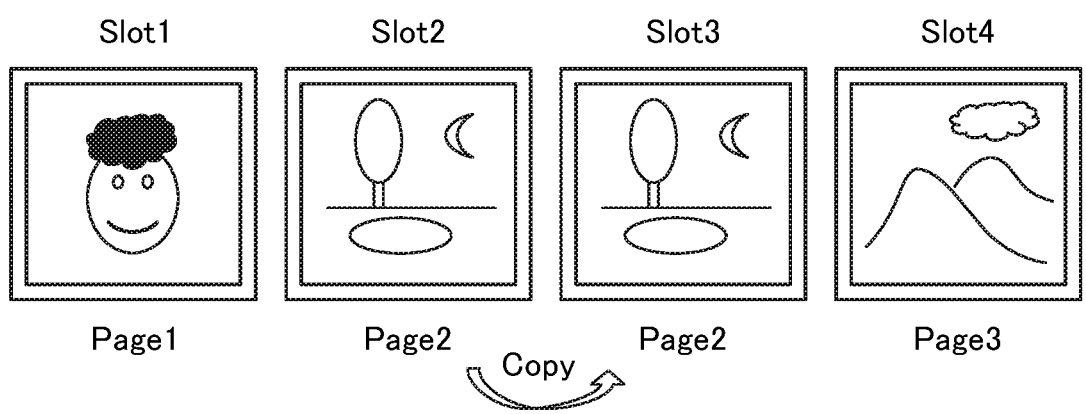
FIG. 9 is a diagram showing an example of layout information of same printing data.
FIG. 10 is a schematic view showing an example where the printing data has been allocated to each of printing slots based on same layout information.

The printing job includes also the printing environment data shown in FIG. 2, and, as shown in FIG. 9, for example, the layout information within the printing environment data includes: whether or not there is to be a skip of each page (Skip); and information of number-of-sheets-to-be-printed (Print). FIG. 9 shows an example where the number-of-pages P of the printing data is "3", and the number-of-slots S of the printing template is "4". In the example of FIG. 9, the number-of-sheets-to-be-printed of the first page and the third page are set to "1", the number-of-sheets-to-be-printed of the second page is set to "2", and there are no pages set having a skip. Upon the printing data made up of the multi-page PDF shown in FIG. 8 being fed into the hot folder 11 under such conditions, the first slot (Slot1) of the printing template is allocated with the first page (Page1), the second slot (Slot2) of the printing template is allocated with the second page (Page2), the third slot (Slot3) of the printing template is allocated with a copy that has been made of the second page (Page2), and the fourth slot (Slot4) of the printing template is allocated with the third page (Page3), as shown in FIG. 10.

Figure 11:
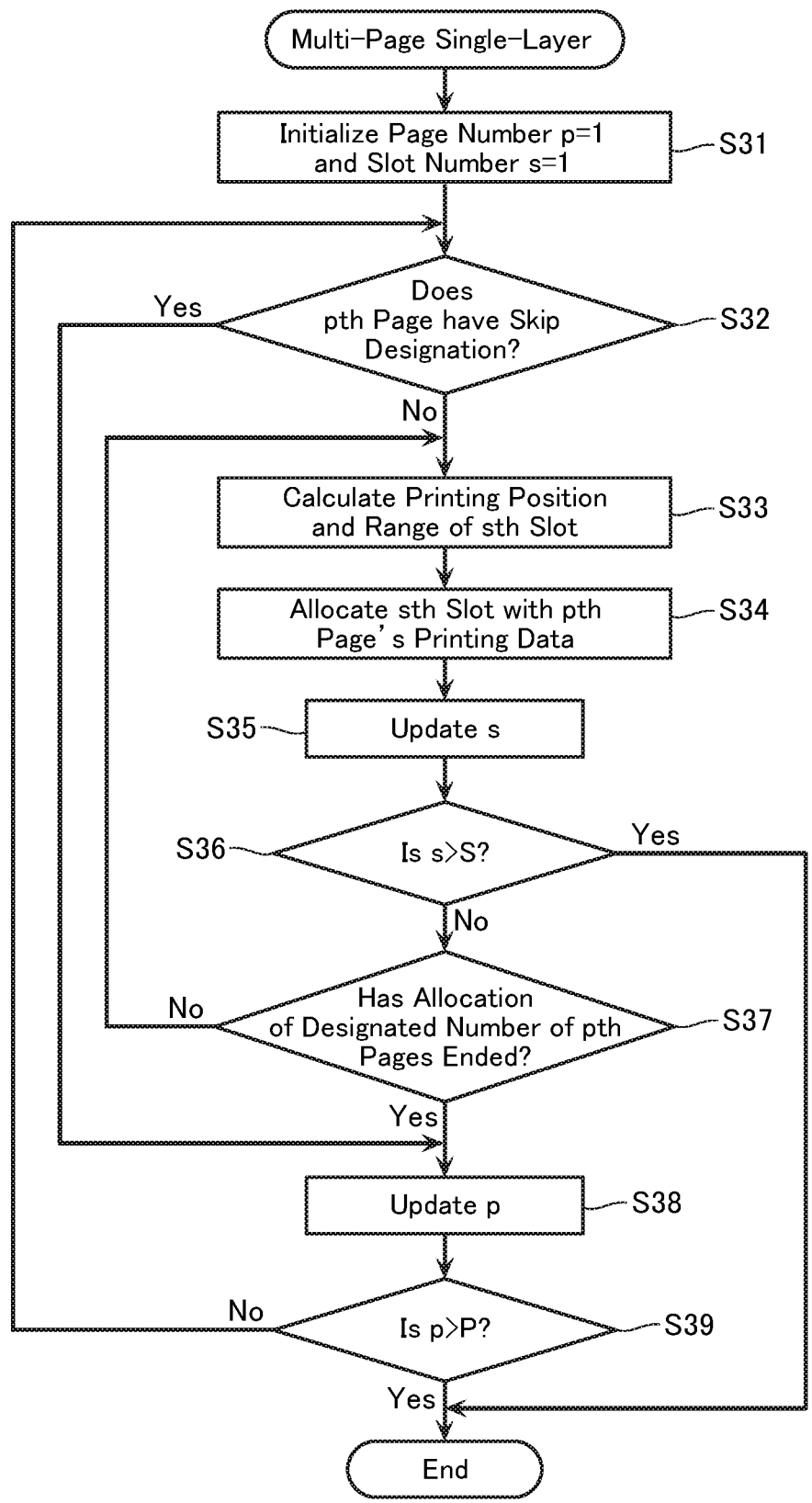
FIG. 11 is a flowchart showing multi-page single-layer allocation processing.

FIG. 11 is a flowchart showing such multi-page single-layer allocation processing. First, page number p and slot number s are set to initial values "1" (step S31). Next, judgement is made of whether the $p^{th}$ page has a skip designation or not (step S32), and in the case of it not having a skip designation, printing position and printing range of the $s^{th}$ slot are calculated based on the jig layout information (step S33), and the $s^{th}$ slot is allocated with printing data of the $p^{th}$ page (step S34). The slot number s is updated (step S35), and while processing is ended when the slot number s exceeds the number-of-slots S (step S36), if the slot number s does not exceed the number-of-slots S, then judgement is made of whether allocation of the full number-of-sheets that the $p^{th}$ page has been designated with by Print has ended (step S37). In the case where allocation of the designated number-of-sheets has not ended, processing returns to calculation of the printing slot position from step S33, while in the case where allocation of the designated number-of-sheets has ended, the page number p is updated (step S38). While processing ends when the page number p exceeds the number-of-pages P (step S39), if the page number p does not exceed the number-of-pages P, processing returns to step S32 where judgement is made of whether the $p^{th}$ page has a skip designation or not. Moreover, if it is judged in step S32 that the $p^{th}$ page has a skip designation, then processing jumps to the processing for updating of page number p (step S38).

Due to this embodiment, allocation processing in line with the printing environment data is executed merely by the printing data it is desired to allocate being multi-paged and then stored in the hot folder 11, so there is no need for the printing data of individual pages to each be allocated. Moreover, the printing data is allocated to each of the printing slots based on the jig layout information, so position of the object-to-be-printed and the printing position will never be out of alignment either.

Note that in the above-described embodiment, it was designated whether or not there is to be skip of a page. However, a configuration may be adopted allowing it to be designated whether or not there is to be skip in use of a printing slot. In this case, information of the printing slot to be skipped is priorly designated in the layout information as skip slot information. Then, before or after step S32 of FIG. 11, judgement is made of whether or not there is to be a skip of the $s^{th}$ slot, based on the skip slot information, and, if there is to be a skip, then processing should proceed to step S35 and the slot number s be updated, and if there is not to be a skip, then allocation processing on the $s^{th}$ slot should be executed. If this kind of processing is performed, then in the case where, for example, the frame 17 of a certain printing slot 16 of the jig 15 created by multi-layer printing of UV-curable ink previously mentioned is unusable due to damage, or the like, it is possible for said printing slot 16 to be designated by the input unit 14a, and for allocation of a page to that printing slot 16 to be skipped.

Note that the above-described multi-page data can be created too from a plurality-of-items of single-page single-layer printing data.

Figures 12, 13:
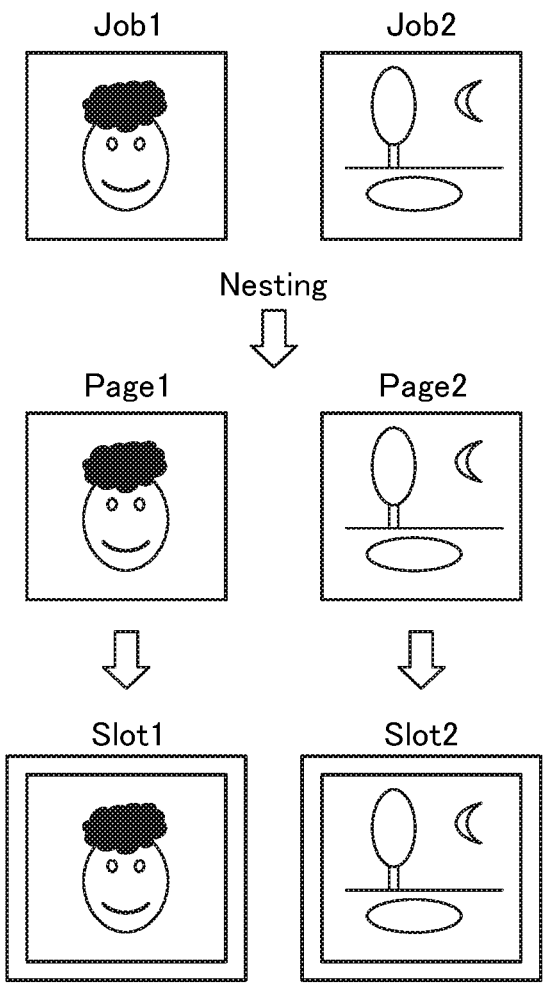
FIG. 12 is a schematic view showing an example where a single-page multi-job undergoes nesting to generate multi-page single-layer printing data.
FIG. 13 is a diagram showing an example of layout information of same printing data.

FIG. 12 shows an example where multi-page single-layer printing data is created by performing nesting processing of two items of printing data (Job1, Job2). Now, "nesting processing" refers to processing including: a function by which a plurality-of-items of printing data (plurality of printing jobs) are processed gathered into one; and a function by which when the plurality-of-items of printing data are gathered into one, disposition of each item of printing data is adjusted so as to eliminate wasted space. However, in this embodiment, once the layout information is set, allocation processing according to this layout information is prioritized. Therefore, in the "nesting processing" mentioned herein, it is solely the multi-paging by integration of printing data items that is executed, and the disposition of the printing data items accords with the layout information. Such nesting processing may be performed by the printing data generating device 20, or may be performed by editing work of the printing job within the raster image conversion device 10.

When the multi-page single-layer printing data created as a result of nesting is accorded with layout information of the kind shown in FIG. 13, the first slot (Slot1) of the printing template is allocated with the first page (Page1), and the second slot (Slot2) of the printing template is allocated with the second page (Page2), as shown in FIG. 12.

(2) Multi-Page Multi-Layer Printing

In such a case as when, for example, a transparent smartphone case undergoes thickly-layered printing by UV-curable ink, there is sometimes performed multi-layer printing of the kind where white ink is printed on the whole surface as a base layer, an image due to CMYK ink is printed on top of that base layer, and thickly-layered printing using a varnish ink is further performed on top of that printed image. Hereafter, an example will be used to describe multi-layer printing by a multi-pass printing system where as many ink jet heads as there are layers to be printed are moved back-and-forth in a sub-scanning direction with respect to the table (platen) of the ink jet printer 30. However, it goes without saying that the multi-layer printing is applicable too to a single-pass printing system where nozzles discharging ink of each layer are shifted a fractional amount at a time in the sub-scanning direction, so that while the ink of each layer is simultaneously discharged, the printing of each of the printing layers is performed in a once-only head scan operation at a shifted amount portion of pitch.

In the present embodiment, the printing data for performing the above-mentioned kind of multi-layer printing is also inputted as multi-page data. FIG. 14 shows an example of multi-page multi-layer printing data to be inputted. This printing data includes three pages of image data respectively corresponded to three layers configuring one image. The first page is image data for printing of white ink, the second page is image data for printing of CMYK ink, and the third page is image data for printing of varnish ink.

FIG. 15 is an example of layout information (or layer printing information) in this case. FIG. 15 shows an example where the number-of-pages P of the printing data is "3", and the number-of-slots S of the printing template is "4". In the example of FIG. 15, layer of the first page is set to "1" and its color mode set to "White", layer of the second page is set to "2" and its color mode set to "CMYK", and layer of the third page is set to "3" and its color mode set to "Varnish". Moreover, whether there is to be a skip or not (Skip) for each of the pages are all set to nil, number-of-times-of-overlaying (Multiplex) of layers of the printing data are also all set to nil, and the numbers-of-sheets-to-be-printed (Print) of the first to third pages are each set to "4". Note that in addition, if Mirror conversion image processing is used, then when a transparent medium such as an acrylic medium undergoes multi-layer printing (in an order of "CMYK", "White", for example) and has a printing image shown on it from a reverse side, it is possible for the same orientation (appearance) as in the original image to be maintained, although this is not illustrated. Therefore, it is also possible for Mirror to be included in the layout information (or layer printing information).

As shown in FIG. 16, upon the printing data made up of the multi-page PDF shown in FIG. 14 being fed into the hot folder 11 under such conditions, the first layers of the first through fourth slots of the printing template are allocated with the first page, their second layers are likewise allocated with the second page, and their third layers are likewise allocated with the third page. The first layers, second layers, and third layers are outputted to the ink jet printer 30 in the form of raster image data for, respectively, a first time of printing, a second time of printing, and a third time of printing.

Figure 17:
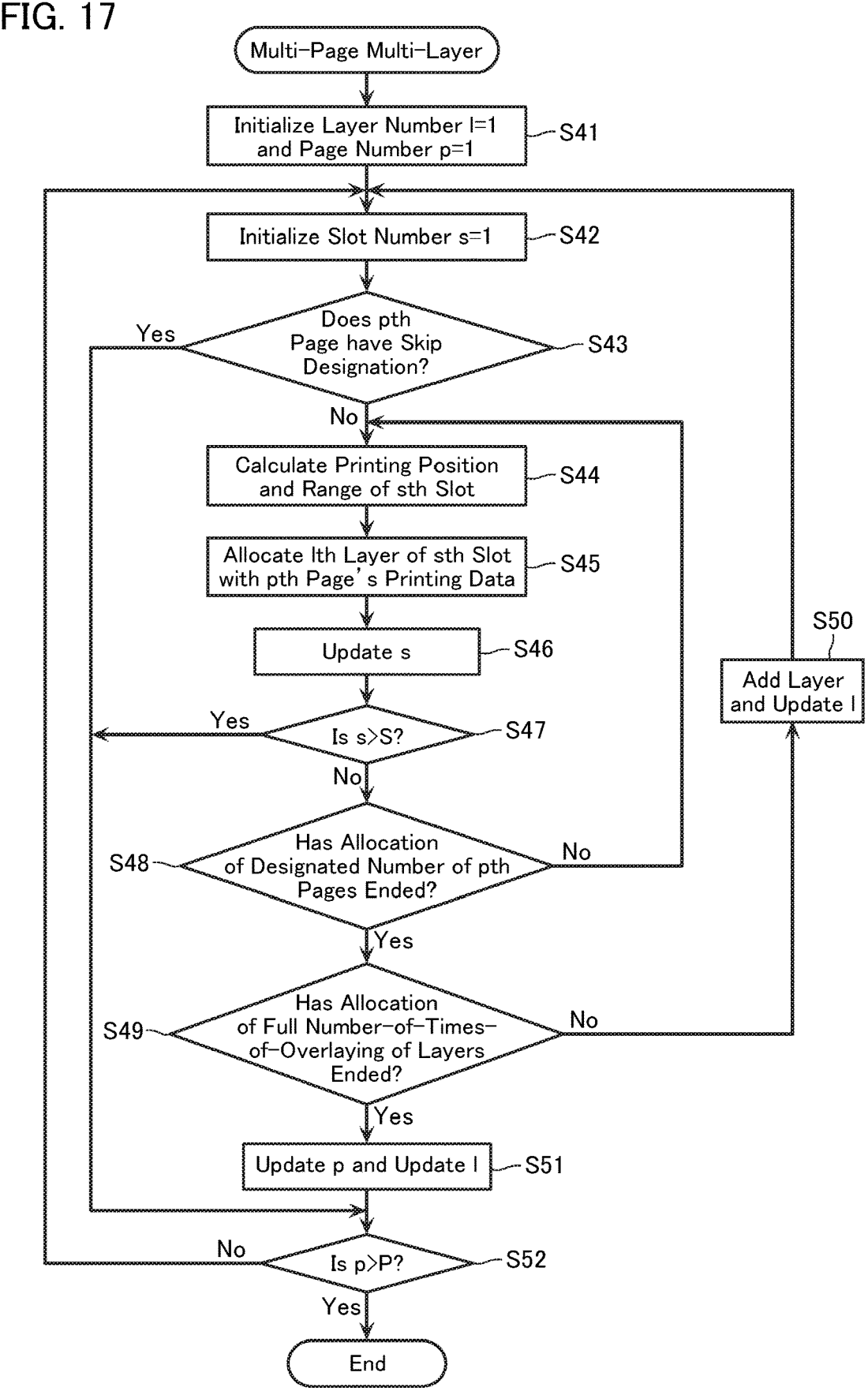
FIG. 17 is a flowchart showing multi-page multi-layer allocation processing.

FIG. 17 is a flowchart showing this multi-page multi-layer allocation processing. First, layer number 1 and page number p are set to initial values "1" (step S41). Next, slot number s is set to an initial value "1" (step S42). Next, judgement is made of whether the $p^{th}$ page has a skip designation or not (step S43), and in the case of it not having a skip designation, printing position and printing range of the $s^{th}$ slot are calculated based on the jig layout information (step S44), and the $l^{th}$ layer of the $s^{th}$ slot is allocated with printing data of the $p^{th}$ page (step S45). The slot number s is updated (step S46), and while processing is ended when the slot number s exceeds the number-of-slots S (step S47), if the slot number s does not exceed the number-of-slots S, then judgement is made of whether allocation of the full number-of-sheets that the $p^{th}$ page has been designated with by Print has ended (step S48). In the case where allocation of the designated number-of-sheets has not ended, processing will return to calculation of the printing slot position from step S44, while in the case where allocation of the designated number-of-sheets has ended, judgement is made of whether layer allocation of the full number-of-times-of-overlaying of layers designated by Multiplex has ended (step S49). If allocation of the full number-of-times-of-overlaying of layers has not ended, then a layer is added and the layer number 1 updated (step S50), after which processing returns to step S42, whereby the slot number s is initialized to "1". In step S49, if layer allocation of the full number-of-times-of-overlaying of layers has ended, then the page number p is updated (step S51). While processing will end when the page number p exceeds the number-of-pages P (step S52), if the page number p does not exceed the number-of-pages P, then processing will return to step S42 and the slot number s be thereby initialized to "1", after which judgement is made of whether the $p^{th}$ page has a skip designation or not (step S43). Moreover, if it is judged in step S43 that the $p^{th}$ page has a skip designation, then processing jumps to the processing for updating of page number p (step S51).

By the printing data for performing multi-layer printing being inputted as multi-page printing data as above, the multi-layer printing data can be allocated to each of the printing slots of the printing template under the conditions designated by the printing environment data. Now, there may be added to the processing of FIG. 17 a processing in which, similarly to as previously mentioned, in the case of the frame 17 of a certain printing slot 16 of the jig 15 being unusable due to damage, or the like, said printing slot 16 is designated by the input unit 14a, and allocation of a page to that printing slot 16 is skipped.

Note that the multi-page printing data to perform the multi-layer printing, that are to be inputted, may be priorly created by the printing data generating device 20, or there may be a configuration for them to be created by editing work of the printing job within the raster image conversion device 10. However, if the printing data generating device 20 is used, then in order to automate from the printing job being fed into the hot folder 11 up to printing output of the ink jet printer 30, that series of processing must be priorly recorded in the printing environment data as the printing workflow. When the printing workflow is priorly created by the printing data generating device 20, it is possible for layer printing information of each page of the multi-page PDF to be stored as the printing environment data, and automated as the printing workflow.

Moreover, the above-described multi-page multi-layer printing data can be created too from single-layer printing data.

Figure 18:
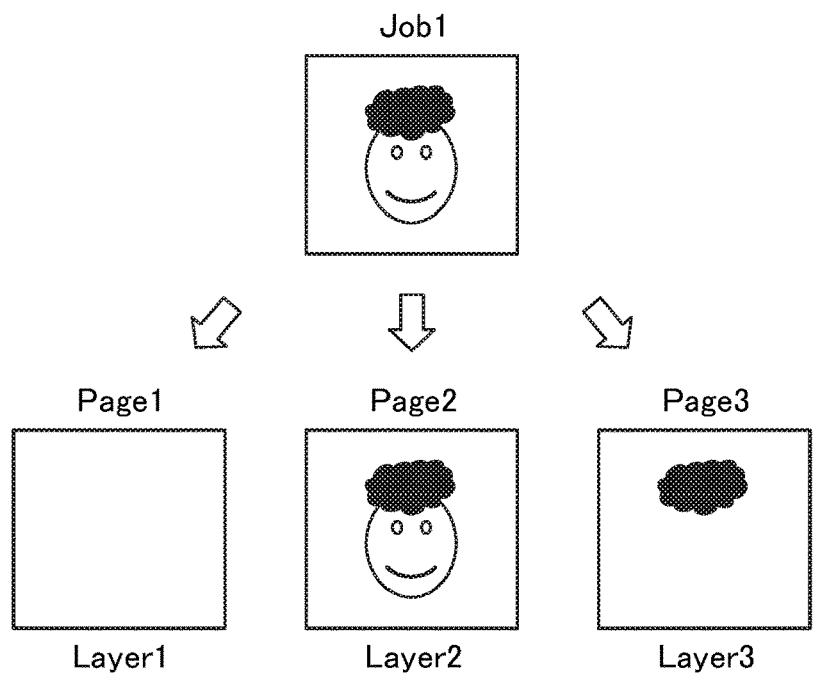
FIG. 18 is a schematic view showing an example where multi-page multi-layer printing data is generated from single-job printing data.

FIG. 18 is a diagram showing an example where multi-page multi-layer printing data is generated from a single item of printing data (Job1). In the raster image conversion device 10, image processing technology, or the like, is employed to automatically or semi-automatically extract from the single item of printing data the likes of a backing image layer, a color image layer, and a varnish image layer, and generate a single item of printing data having these layers respectively allocated to a first page, a second page, and a third page. In the case of the layers being automatically generated, there can also be performed processing such as extracting the whole surface of an image, extracting a portion thereof where color is present, extracting a portion thereof where color is not present, and extracting an image with the entire page set to a flat arbitrary density and a black-and-white-inverted image of same image. Moreover, in the case of the layers being automatically generated, there may be included functions that designate breeding (enlargement with respect to the original image) and choke (reduction with respect to the original image). Note that there may be used a designation of the layout information similar to the one shown in FIG. 13, for example.

Figure 19:
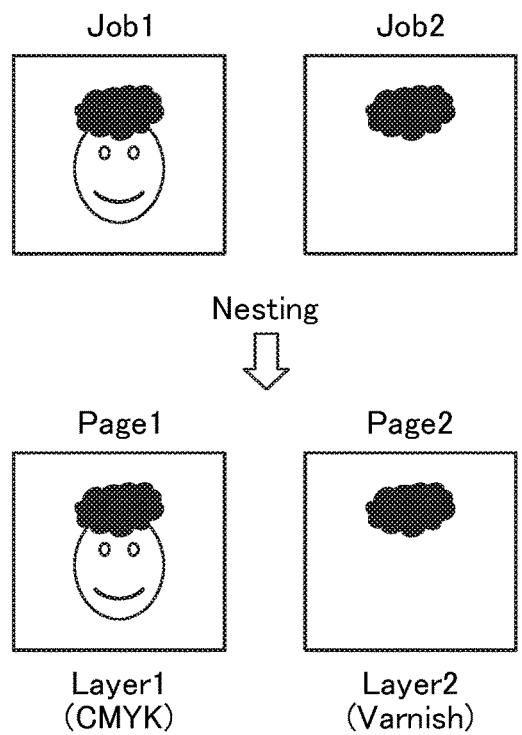
FIG. 19 is a schematic view showing an example where a multi-job undergoes nesting to generate multi-page multi-layer printing data.

FIG. 19 is a diagram showing an example where differing single-page items of printing data (Job1, Job2) that have been created for layer printing undergo nesting processing to create multi-page multi-layer printing data. Such nesting processing may be performed by the printing data generating device 20, or may be performed by editing work of the printing job within the raster image conversion device 10.

Figures 20, 21:
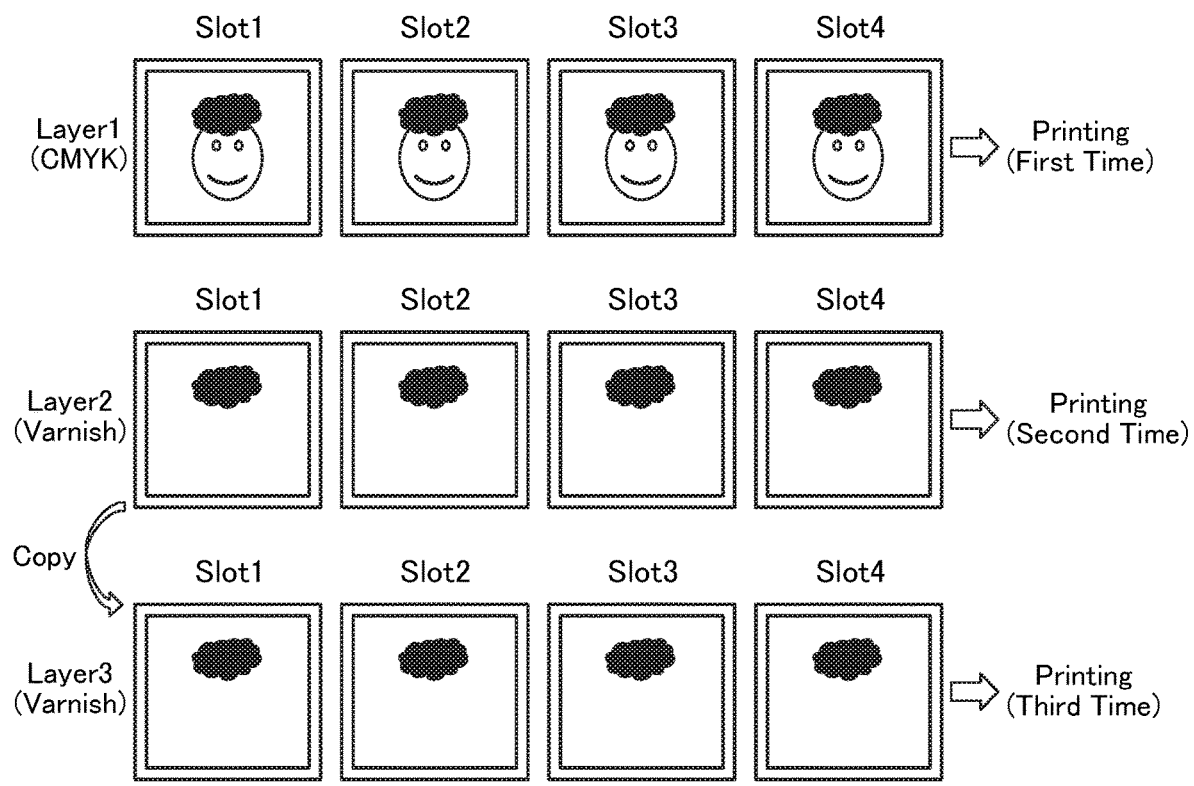
FIG. 20 is a diagram showing an example of layout information of same printing data.
FIG. 21 is a schematic view showing an example where the printing data has been allocated to each of the printing slots based on same layout information.

FIG. 20 is a diagram showing an example of other layout information for the multi-page multi-layer printing data shown in FIG. 19. In this layout information, the first page is designated to the first layer (color mode=CMYK) and second page designated to the second layer (color mode=Varnish), their numbers-of-sheets-to-be-printed (Print) are each set to "4", and the number-of-times-of-overlapping (Multiplex) of the second layer is set to "1".

Upon the printing data being stored in the hot folder 11 under such conditions, allocation processing of the kind shown in FIG. 21 is executed. That is, after allocation of the second layer has ended, a third layer is added as a result of Multiplex being "1", and the printing data of the second layer is copied to that third layer. The number of layers of printing can thus be arbitrarily changed by designation of a number-of-times-layer-is-to-be-copied in the layout information.

FIG. 22 shows an example where a plurality-of-items of printing data (Job1, Job2), each being multi-page multi-layer, undergo nesting to create a single-item of multi-page multi-layer printing data. The nesting processing may be performed by the printing data generating device 20, or may be performed by editing work of the printing job within the raster image conversion device 10. This example also includes the case where each page of the multi-page single-layer printing data shown in FIG. 8 is multi-layered as shown in FIG. 18.

In this example, as shown in FIG. 22, the first page corresponds to the first layer in the first page of Job1, the second page corresponds to the second layer in the second page of Job1, the third page corresponds to the first layer in the first page of Job2, and the fourth page corresponds to the second layer in the second page of Job2. FIG. 23 shows an example of layout information (or layer printing information). In this example, the color modes of the first page and the third page are set to "CMYK", the color modes of the second page and the fourth page are set to "Varnish", the numbers-of-sheets-to-be-printed of the first page and the second page are set to "3", and the numbers-of-sheets-to-be-printed of the third page and the fourth page are set to "1".

As shown in FIG. 24, upon the printing data being stored in the hot folder 11 under such conditions, the first layers of the first through third slots are allocated with the first page, the second layers of the first through third slots are allocated with the second page, the first layer of the fourth slot is allocated with the third page, and the second layer of the fourth slot is allocated with the fourth page.

The above-described processing is realizable by configuring so that the flowchart shown in FIG. 17 is executed for each of the printing jobs, while at the same time the initial value of the slot number is changed every printing job.

Figures 25, 26:
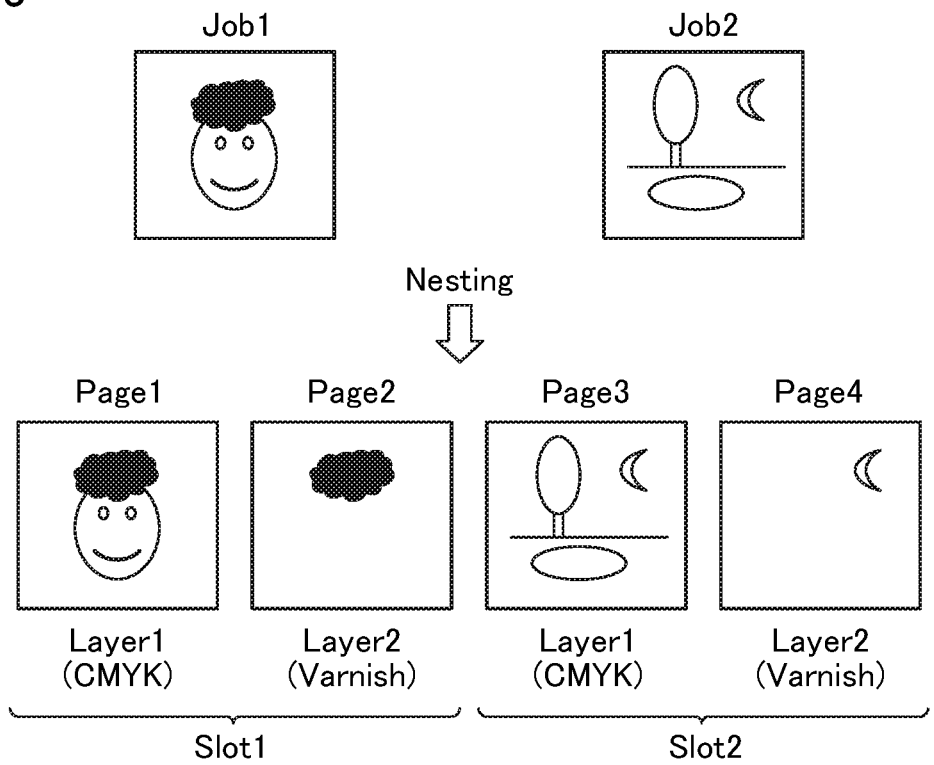
FIG. 25 is a schematic view showing an example where a single-page multi-job undergoes nesting to generate multi-page multi-layer printing data.
FIG. 26 is a diagram showing an example of layout information of same printing data.

FIG. 25 is a diagram showing an example where multi-page multi-layer printing data is created from a plurality-of-items of single-page single-layer printing data (Job1, Job2) by the plurality-of-items of single-page printing data (Job1, Job2) undergoing nesting processing, while at the same time each item of the printing data undergoes the multi-layering processing shown in FIG. 18.

When the multi-page multi-layer printing data created as a result of nesting and multi-layering is accorded with layout information of the kind shown in FIG. 26, the first slot (Slot1) of the printing template is allocated with the first page (Page1) and second page (Page2), and the second slot (Slot2) of the printing template is allocated with the third page (Page3) and fourth page (Page4), as shown in FIG. 25.

Figures 27, 28:
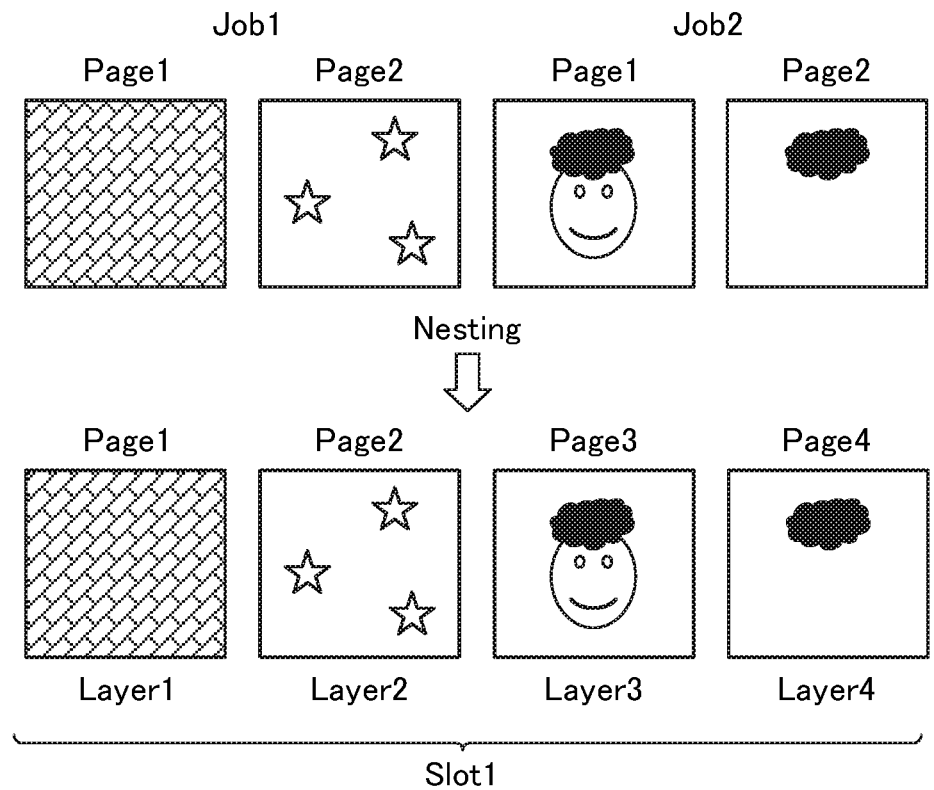
FIG. 27 is a schematic view showing another example where a multi-page multi-job undergoes nesting to generate multi-page multi-layer printing data.
FIG. 28 is a diagram showing an example of layout information of same printing data.

FIG. 27 is a diagram showing an example where a plurality-of-items of multi-page printing data (Job1, Job2) undergo nesting processing for the obtained multi-page printing data to be allocated to a common slot.

The layout information in this case is shown in FIG. 28. When the number of layers is set according to page numbers in this way, the common slot (Slot1) will be allocated with the first page (Page1) through fourth page (Page4).

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

DESCRIPTION OF REFERENCE NUMERALS 10 raster image conversion device
11 hot folder
12 raster image conversion processing unit
13 storage unit
14 operating unit
20 printing data generating device
30 ink jet printer

The invention claimed is:

1. A raster image conversion device that is inputted with printing data, and converts this printing data into raster image data to be outputted to a printing device, the raster image conversion device having:
   a storage unit that stores printing environment data stipulating conditions for converting the printing data into the raster image data;
   an operating unit for setting or editing the printing environment data stored in the storage unit; and
   a conversion processing unit that converts the printing data into the raster image data, based on the printing environment data stored in the storage unit,
   the printing environment data including printing template information having a plurality of printing slots,
   the operating unit comprising an operating mode enabling the printing template information to be generated or edited, and
   the conversion processing unit being inputted with or generating printing data made up of a plurality of pages, and, based on the printing template information, executing a printing data allocation processing in which a printing position and printing range of each page of the printing data are allocated to the printing slots of the printing template information.

2. The raster image conversion device according to claim 1, wherein
   the printing data includes a plurality of layers overlappingly printed at the same printing position, with each layer being allocated to each page, and
   the conversion processing unit allocates the plurality of layers to the same printing slot.

3. The raster image conversion device according to claim 2, wherein
   the conversion processing unit is inputted with a plurality-of-items of the printing data having a plurality of layers, performs nesting processing of these plurality-of-items of printing data to configure them as a single-item of printing data made up of a plurality of pages, and allocates each page of this printing data to the printing slots so that the plurality of layers will be disposed in the same printing slot.

4. The raster image conversion device according to claim 2, wherein
   the conversion processing unit is inputted with printing data made up of a single page, and generates from the printing data made up of a single page the printing data made up of a plurality of pages corresponding to a plurality of layers.

5. The raster image conversion device according to claim 2, wherein
   the printing environment data includes interlayer copy information indicating interlayer copy of each page of the printing data, and
   the conversion processing unit generates the same number of layers as the number set in the interlayer copy information, and allocates the same page to the same printing slot.

6. The raster image conversion device according to claim 1, wherein
   the conversion processing unit is inputted with a plurality-of-items of printing data that are made up of a single page, and performs nesting processing of these plurality-of-items of printing data to generate the printing data made up of a plurality of pages.

7. The raster image conversion device according to claim 1, wherein
   the printing environment data includes: skip information indicating necessity/unnecessity of printing of each page of the printing data; and number-of-sheets-to-be-printed information stipulating the number of sheets to be printed of each of the pages, and
   the conversion processing unit, at a time of necessity being indicated by the skip information, skips allocation processing to the printing slot of a relevant page, and at a time of unnecessity being indicated by the skip information, allocates the same page to the same number of printing slots as the number set in the number-of-sheets-to-be-printed information.

8. The raster image conversion device according to claim 1, wherein
the printing environment data includes printing slot skip information designating the printing slot not to be allocated with the printing data, and
the conversion processing unit skips allocation processing of a page of the printing data to the printing slot designated by the printing slot skip information.

9. The raster image conversion device according to claim 1, wherein
the conversion processing unit is inputted with the printing data including a plurality of pages, and, for each of the pages, further generates a plurality of layers.

10. The raster image conversion device according to claim 1, further having
a hot folder that stores the printing data,
wherein the hot folder is associated with a printing workflow that includes the printing data allocation processing, and
the conversion processing unit activates the printing workflow corresponding to the hot folder when the printing data is stored in the hot folder.

11. A printing system comprising:
a raster image conversion device that is inputted with printing data and converts this printing data into raster image data; and
a printing device that performs printing onto an object-to-be-printed, based on raster image data that has been converted by the raster image conversion device,
wherein the printing device is an ink jet printer capable of multi-layer printing using UV-curable ink,
the raster image conversion device has:
a storage unit that stores printing environment data stipulating conditions for converting the printing data into the raster image data;
an operating unit for generating or editing the printing environment data stored in the storage unit; and
a conversion processing unit that converts the printing data into the raster image data, based on the printing environment data stored in the storage unit,
the printing environment data includes printing template information having a plurality of printing slots,
the operating unit comprises an operating mode enabling the printing template information to be generated or edited,
the conversion processing unit is inputted with or creates printing data made up of a plurality of pages, and, based on the printing template information, executes a printing data allocation processing in which a printing position and printing range of each page of the printing data are allocated to the printing slots of the printing template information, and
the printing device performs single-layer or multi-layer printing of the raster image data, onto the object-to-be-printed disposed at a position corresponding to the printing slot, by means of the UV-curable ink.

12. A non-transitory computer-readable storage medium storing a printing processing program by which printing data is inputted, and this printing data converted into raster image data to be outputted to a printing device, the printing processing program causing a computer to execute a process comprising: a storage step in which printing environment data stipulating conditions for converting the printing data into the raster image data, is stored; an operating step for generating or editing the printing environment data stored in the storage step; and a conversion processing step in which the printing data is converted into the raster image data, based on the printing environment data stored in the storage step, the printing environment data including printing template information having a plurality of printing slots, the operating step having a step in which the printing template information is generated or edited, and the conversion processing step including a printing data allocation processing step in which printing data made up of a plurality of pages is inputted or created, and, based on the printing template information, a printing position and printing range of each page of the printing data are allocated to the printing slots of the printing template information.

* * * * *